US012320158B2

(12) United States Patent
Walker

(10) Patent No.: US 12,320,158 B2
(45) Date of Patent: Jun. 3, 2025

(54) METHOD OF SECURING A BATHROOM DOOR WITH A LOCK INFORMED BY USE OF THE BATHROOM SINK

(71) Applicant: Dartangnan Walker, Inglewood, CA (US)

(72) Inventor: Dartangnan Walker, Inglewood, CA (US)

( * ) Notice: Subject to any disclaimer, the term of this patent is extended or adjusted under 35 U.S.C. 154(b) by 204 days.

(21) Appl. No.: 18/056,057

(22) Filed: Nov. 16, 2022

(65) Prior Publication Data

US 2023/0151640 A1 May 18, 2023

Related U.S. Application Data

(60) Provisional application No. 63/279,874, filed on Nov. 16, 2021.

(51) Int. Cl.

| | |
|---|---|
| ***E05B 47/06*** | (2006.01) |
| ***E05B 65/00*** | (2006.01) |
| ***G07C 9/00*** | (2020.01) |
| *E05B 47/00* | (2006.01) |

(52) U.S. Cl.

CPC .......... *E05B 47/06* (2013.01); *E05B 65/0035* (2013.01); *G07C 9/00174* (2013.01); *E05B 2047/005* (2013.01); *E05B 2047/0067* (2013.01)

(58) Field of Classification Search

CPC ................. E05B 47/06; E05B 65/0035; E05B 2047/005; E05B 2047/0067; G07C 9/00174

USPC ........................................................... 340/5.7

See application file for complete search history.

(56) References Cited

U.S. PATENT DOCUMENTS 4,896,144 A * 1/1990 Bogstad ............... G08B 21/245 340/691.6
5,812,059 A * 9/1998 Shaw ................... G08B 21/245 340/539.1
6,215,116 B1 * 4/2001 Van Marcke ........... G01S 17/04 250/221
8,344,893 B1 * 1/2013 Drammeh ............ G08B 21/245 340/573.1
9,447,625 B1 * 9/2016 Seebaransingh ........ E05F 15/73
10,037,678 B2 * 7/2018 Becker ................. G08B 21/245
10,185,921 B1 * 1/2019 Heller ...................... G07C 9/38
10,550,555 B2 * 2/2020 Chen .................... G05D 7/0635
2006/0067545 A1 * 3/2006 Lewis .................. G08B 21/245 381/124

(Continued)

FOREIGN PATENT DOCUMENTS

EP 921506 A1 * 6/1999 ............. E03C 1/057

*Primary Examiner* — Kerri L McNally
*Assistant Examiner* — Thang D Tran
(74) *Attorney, Agent, or Firm* — Edmond DeFrank

(57) ABSTRACT

A system and method for securing individuals within a bathroom until they have washed their hands is described. An electronic magnetic lock installed to the door of the bathroom, which is linked to a switch integrated into a faucet of a sink of the bathroom, prevents individuals from exiting the bathroom until the faucet is activated. Signage present within the bathroom informs individuals of the presence of the system, and an audible message, configured to automatically play over at least one speaker further informs them of the system, and reminds them to wash their hands in order to facilitate an exit of the facility.

20 Claims, 4 Drawing Sheets

(56) References Cited

U.S. PATENT DOCUMENTS

| | | | | |
|---|---|---|---|---|
| 2009/0265990 | A1* | 10/2009 | Stratmann | E05F 15/70<br>221/199 |
| 2009/0300988 | A1* | 12/2009 | Bem | E05B 65/0035<br>70/101 |
| 2014/0121540 | A1* | 5/2014 | Raskin | G16H 40/63<br>600/479 |
| 2016/0333606 | A1* | 11/2016 | Mahoney | E05B 47/0001 |
| 2018/0216325 | A1* | 8/2018 | Chen | G05D 7/0635 |
| 2019/0122463 | A1* | 4/2019 | Romero | G07C 9/22 |
| 2020/0217057 | A1* | 7/2020 | Spiro | G08B 21/22 |
| 2020/0399939 | A1* | 12/2020 | Zafeirakis | E05B 55/00 |
| 2021/0381296 | A1* | 12/2021 | Fava | E05F 15/614 |
| 2021/0405245 | A1* | 12/2021 | Mo | G01V 13/00 |
| 2022/0018531 | A1* | 1/2022 | Mo | A47K 10/48 |
| 2022/0042365 | A1* | 2/2022 | Sripathi | B64C 1/1407 |
| 2022/0108628 | A1* | 4/2022 | Santy | G09B 19/0007 |

* cited by examiner

METHOD OF SECURING A BATHROOM DOOR WITH A LOCK INFORMED BY USE OF THE BATHROOM SINK

CONTINUITY

This application is a non-provisional patent application of provisional patent application No. 63/279,874, filed on Nov. 16, 2021, and priority is claimed thereto.

FIELD OF THE PRESENT INVENTION

The present invention relates to methods for securing a bathroom door, and more specifically relates to a new method and system confirmed to automatically lock a bathroom door until it is reasonably assumed that an entrant has washed their hands at a bathroom sink of the bathroom as a means to enforce hand washing for customers and employees of an establishment.

BACKGROUND OF THE PRESENT INVENTION

Bathrooms, even clean ones, are known to harbor germs. Bacteria and viruses are difficult to avoid, even with the best of intentions. It is common practice that all individuals should wash their hands after use of the bathroom to prevent accumulation of germs on their hands, and to prevent proliferation and/or transmission of the germs to other people and to surfaces outside of the bathroom.

However, handwashing is generally performed on a volunteer basis. There is generally nothing preventing individuals from using the bathroom and then promptly leaving without washing their hands, even to the detriment of others. While signage within bathrooms is often present to encourage the practice of handwashing, these signs are often ignored. Similarly, signage is often present to indicate that employees are required to wash their hands, especially in restrooms within restaurants, customers generally have no way to know whether or not this rule is followed. If there were a gentle way in which customers and employees could be reminded and strongly encouraged to wash their hands upon attempt to exit the bathroom, more individuals would wash their hands, and therefore, germs outside of the bathroom could be minimized. This could be accomplished via a system tied to the faucet of the sink, which would prevent opening of the door until the sink is activated, accompanied by ample signage to inform customers and employees of the feature.

Thus, there is a need for a door locking system and method configured to automatically lock a door of the bathroom on the inside until it has detected activation of a sink faucet of the bathroom. Such a system and method is preferably configured to employ a magnetic, electronic lock disposed on the door which is wired to a switch integrated into the faucet of the sink(s) of the restroom. Upon opening the valve of the faucet, the door will automatically unlock and remain unlocked until a period of time has elapsed.

SUMMARY OF THE PRESENT INVENTION

The present invention is an automated locking system for a restroom which is configured to secure individuals inside of a restroom until a switch integrated into a faucet of the sink of the restroom is activated. As such, the present invention enables a means by which individuals are reminded and strongly encouraged to wash their hands after using the bathroom, and prior to exiting the restroom.

It is an object of the present invention to provide a method for tying the opening and closing of an electronic magnetic lock to a proximal faucet such that the lock will only open after the system has detected activation of the faucet. Further, it is an object of the present invention to encourage use of soap and water in the restroom in order to limit the proliferation and spread of germs, limiting the spread of disease.

Further, it is an object of the present invention to inform individuals within the bathroom via signage and an audible message broadcast via at least one speaker of the presence of the automatic locking feature of the bathroom, and to remind them to wash their hands to facilitate exit of the bathroom.

The following brief and detailed descriptions of the drawings are provided to explain possible embodiments of the present invention but are not provided to limit the scope of the present invention as expressed herein this summary section.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DETAILED DESCRIPTION OF THE PREFERRED EMBODIMENT

Figure 1:
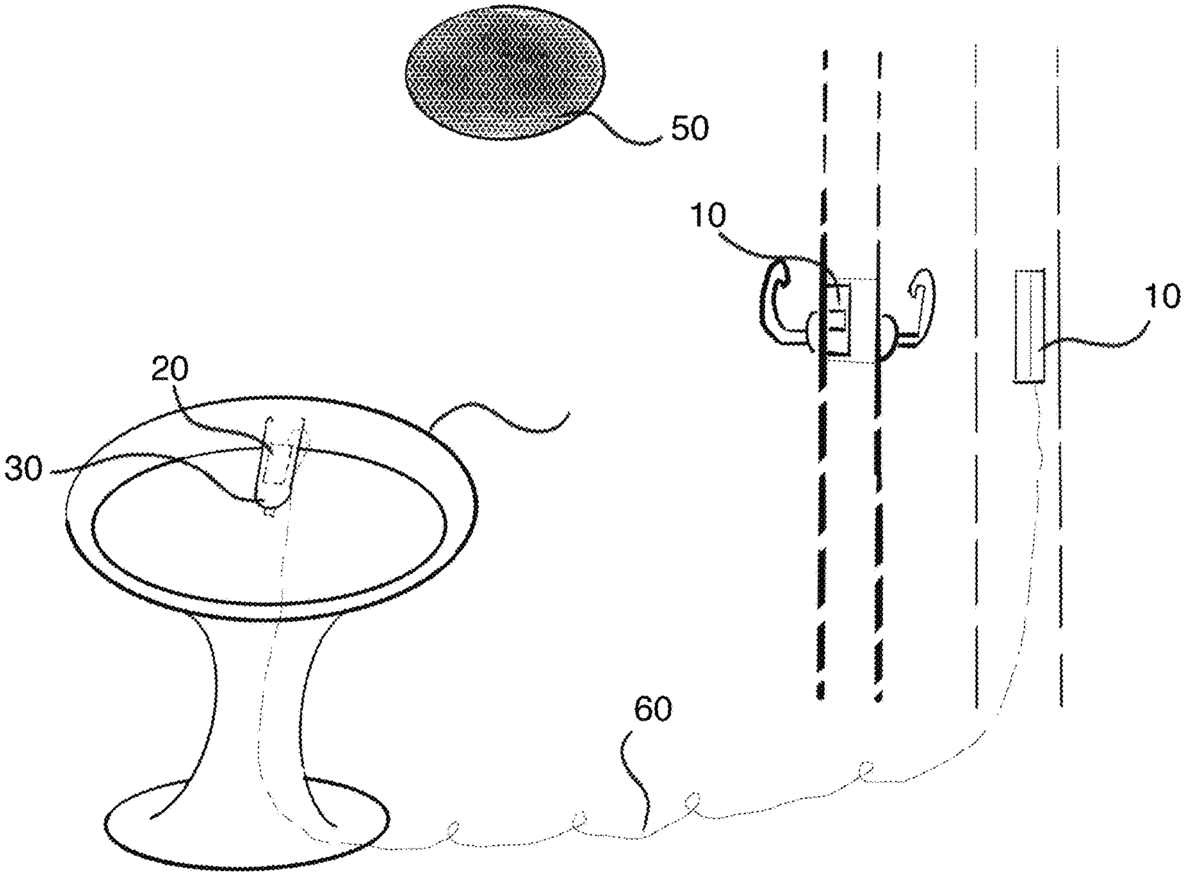
FIG. 1 depicts a view of the primary embodiment of the method system of the present invention shown as a flow chart diagram.

The present specification discloses one or more embodiments that incorporate the features of the invention. The disclosed embodiment(s) merely exemplify the invention. The scope of the invention is not limited to the disclosed embodiment(s).

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention is a method and system configured to facilitate automated securing of a restroom door. The preferred embodiment of the present invention is equipped with an electronic magnetic lock (10). Unlike conventionally installed electronic magnetic locks (10) which are generally wired into a button or manual door release (such as those conventionally found in banks and pawn shops), the electronic magnetic lock (10) of the present invention is instead wired into a motion-sensor switch (20) which is integrated with a sink faucet (30) of the bathroom. The motion-sensor switch (20) may be configured to activate automatically upon the detection of water, however it is primarily envisioned that the switch (20) is tied to the activation of the flow of water from the faucet itself. As many sinks are conventionally equipped with electronic, motion-detecting faucets already, it is preferable that the motion-sensor switch (20) of the present invention be integrated into (or added to) the electronic motion-detecting switch of the faucet itself.

It should be noted that some embodiments of the motion-sensor switch (20) of the present invention may be wirelessly connected to the electronic magnetic lock (10) of the present invention. However, in primary embodiments, the electronic magnetic lock (10) is wired directly to the motion-sensor switch (20) of the faucet (30) with at least one wire (60), preventing lock failure.

The system of the present invention is preferably outlined with signs (40) which are present on walls and/or doors of the restroom to inform individuals of the presence of the system, and to remind them to use sink to wash their hands in order to unlock the door. Additionally, at least one speaker (50) is preferably installed and present within the restroom. The at least one speaker (50) is configured to convey an audible message to individuals within the restroom in order to inform them of the automatic locking feature, and remind them to use the sink in order to wash their hands. The audible message is preferably automated, and is therefore automatically started after a short period of time has elapsed after the door has been opened. The speaker is preferably linked to a logic board, PCB, or other system-on-a-chip (SoC) which manages the locking/unlocking of the electronic magnetic lock (10), the playback of the audible message over the at least one speaker (50). Further, it should be understood that fire-safety systems, such as fire alarms, are configured to automatically override the locking feature of the electronic magnetic lock (10) of the present invention, providing for quick and safe exit of the restroom in the event of an emergency.

Figure 2:
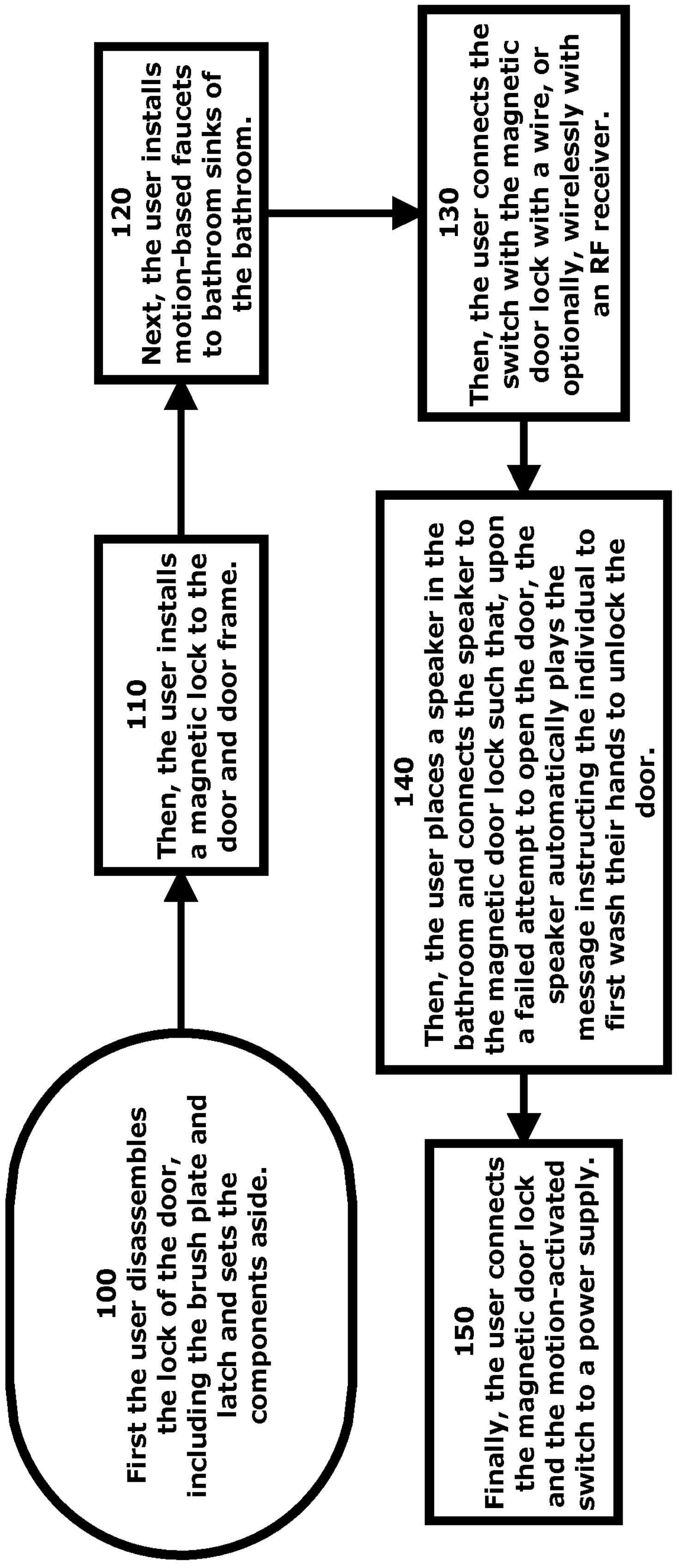
FIG. 2 depicts a flow chart detailing the process of installation of the present invention.

The process of installation and use of the system and apparatus of the present invention, as shown in FIG. 2, is preferably as follows:

1. First the user disassembles the lock of the door, including the brush plate and latch and sets the components aside. (100)
2. Then, the user installs a magnetic lock to the door and door frame. (110)
3. Next, the user installs motion-based faucets to bathroom sinks of the bathroom. (120) The motion-based faucet is equipped with the motion-activated switch (20) of the present invention.
4. Then, the user connects the switch with the magnetic door lock with a wire, or optionally, wirelessly with an RF receiver. (130)
5. Then, the user places a speaker in the bathroom and connects the speaker to the magnetic door lock such that, upon a failed attempt to open the door, the speaker automatically plays the message instructing the individual to first wash their hands to unlock the door. (140)
6. Finally, the user connects the magnetic door lock and the motion-activated switch to a power supply. (150)

Figure 3:
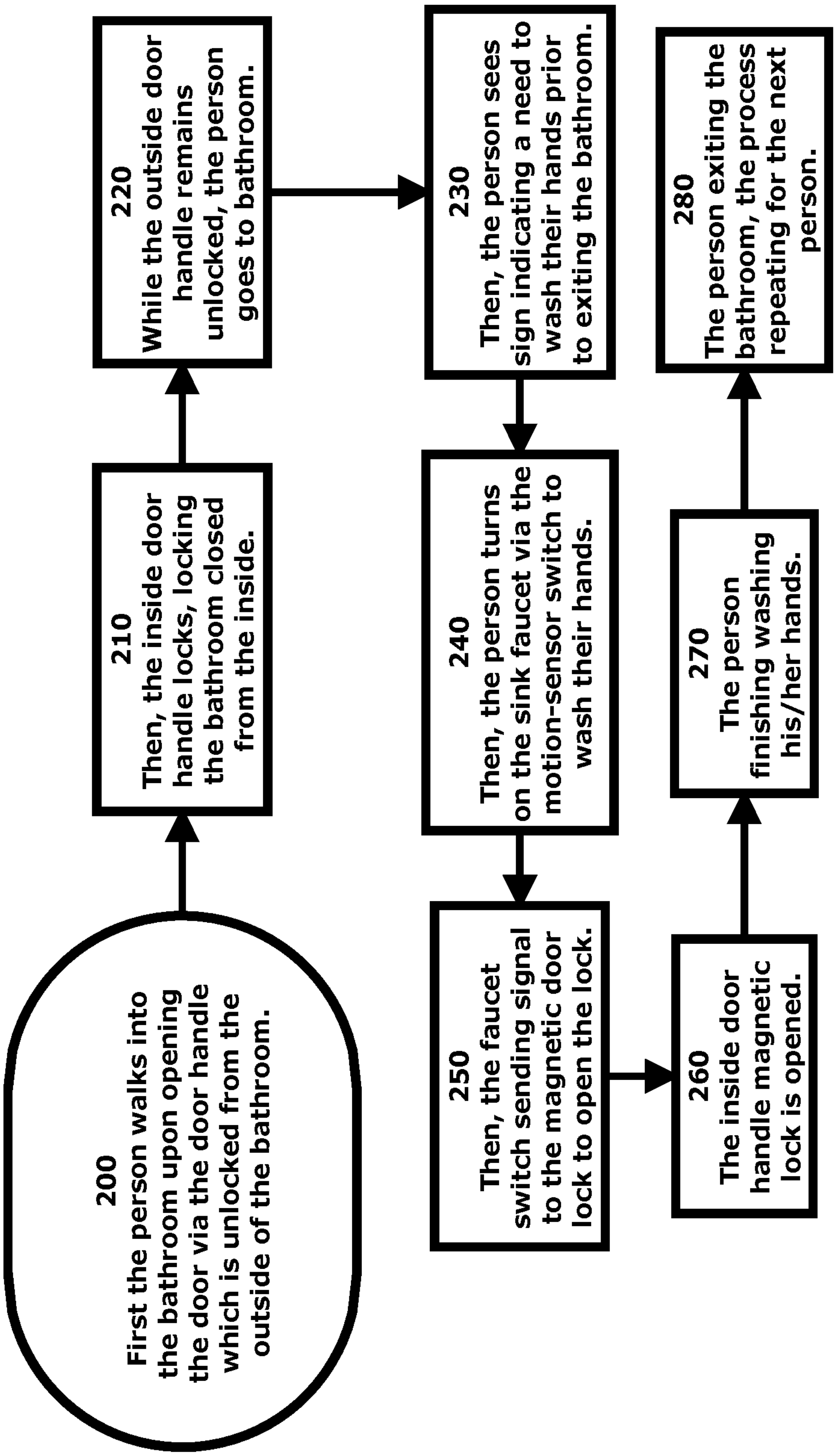
FIG. 3 exhibits a flow chart detailing the process of use of the present invention by an individual using the bathroom.
Figure 4:
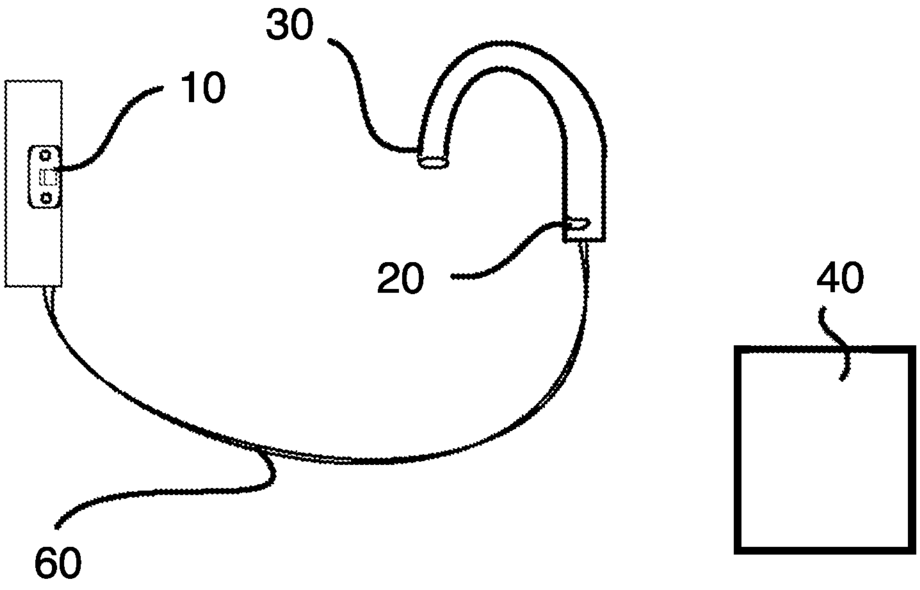
FIG. 4 depicts a basic view of the preferred embodiment of the present invention, showing the components of use in the method.

As noted in FIG. 3, use of the present invention by an individual using the bathroom is as follows:

1. First the person walks into the bathroom upon opening the door via the door handle which is unlocked from the outside of the bathroom. (200)
2. Then, the inside door handle locks, locking the bathroom closed from the inside. (210)
3. While the outside door handle remains unlocked, the person goes to bathroom. (220)
4. Then, the person sees sign indicating a need to wash their hands prior to exiting the bathroom. (230)
5. Then, the person turns on the sink faucet via the motion-sensor switch to wash their hands. (240)
6. Then, the faucet switch sending signal to the magnetic door lock to open the lock. (250)
7. The inside door handle magnetic lock is opened. (260)
8. The person finishing washing his/her hands. (270)
9. The person exiting the bathroom, the process repeating for the next person. (280)

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A system for controlling a door of a restroom automatically, comprising:

an electronic magnetic lock, said electronic magnetic lock disposed on the door of the restroom;

a motion-sensor switch said motion-sensor switch disposed of in wireless electronic communication with a faucet of the sink of the restroom;

wherein said electronic magnetic lock is disposed of in wireless electronic communication with said motion-sensor switch;

at least one speaker, said at least one speaker disposed within the restroom;

wherein said at least one speaker is disposed of in wireless electronic communication with said motion-sensor switch;

wherein said electronic magnetic lock is configured to lock the door of the restroom automatically upon closure of the door after a user enters the restroom;

wherein said electronic magnetic lock is configured to unlock the door only after said motion-sensor switch is activated; and wherein said at least one speaker is configured to sound an alert notifying the user to use the sink to wash hands of the user prior to the user exiting the restroom via the door; and an emergency override system coupled to the electronic magnetic lock configured to automatically unlock the electronic magnetic lock on the door of the restroom when an emergency is detected.

2. The system for controlling a door of a restroom automatically of claim 1, wherein said electronic magnetic lock is configured to unlock the door after an opening of a valve of the faucet is detected.

3. The method for controlling a door of a restroom automatically of claim 1, wherein the at least one speaker is further configured for audibly alerting the user of the system for controlling the door of the restroom automatically with a need to use the sink prior to exiting the bathroom to unlock the door.

4. The system for controlling a door of a restroom automatically of claim 1, wherein after the door is unlocked, the door will remain unlocked until a predetermined period of time has elapsed.

5. The system for controlling a door of a restroom automatically of claim 1, wherein the emergency override system is further configured to unlock the electronic magnetic lock to automatically to provide a quick and safe exit of the restroom in the event of an emergency.

6. The system for controlling a door of a restroom automatically of claim 1, wherein the electronic magnetic lock includes an RF receiver.

7. A system for controlling a door of a restroom automatically, comprising:

an electronic magnetic lock, said electronic magnetic lock disposed on the door of the restroom;

a motion-sensor switch said motion-sensor switch disposed of in wireless electronic communication with a flow of water from a faucet of the sink of the restroom;

wherein said electronic magnetic lock is disposed of in wireless electronic communication with said motion-sensor switch using radio frequency signals;

at least one speaker, said at least one speaker disposed within the restroom;

wherein at least one speaker is disposed of in wireless electronic communication with said motion-sensor switch using RF wireless signals;

wherein said electronic magnetic lock is configured to lock the door of the restroom automatically upon closure of the door after a user enters the restroom;

wherein said electronic magnetic lock is configured to unlock the door only after said motion-sensor switch is activated and detects the flow of the water from the faucet; and wherein at least one speaker is configured to sound an alert notifying the user to use the sink to wash hands of the user prior to the user exiting the restroom via the door; and an emergency override system coupled to the electronic magnetic lock configured to automatically unlock the electronic magnetic lock on the door of the restroom when an emergency is detected.

8. The system for controlling a door of a restroom automatically of claim 7, wherein the at least one speaker audibly alerts the user of the system for controlling the door of the restroom automatically with a need to use the sink prior to exiting the bathroom to unlock the door.

9. The system for controlling a door of a restroom automatically of claim 7, wherein the emergency override system is further configured to unlock the electronic magnetic lock to automatically provide a quick and safe exit of the restroom in the event of an emergency.

10. The system for controlling a door of a restroom automatically of claim 7, wherein after the door is unlocked, the door will remain unlocked until a predetermined period of time has elapsed.

11. The system for controlling a door of a restroom automatically of claim 7, wherein the at least one speaker is coupled to a logic board.

12. The system for controlling a door of a restroom automatically of claim 11, wherein the logic board is configured to manage the locking/unlocking of the electronic magnetic lock.

13. The system for controlling a door of a restroom automatically of claim 12, wherein the logic board is further configured to activate playback of the audible message over the at least one speaker.

14. A system for controlling a door of a restroom automatically, comprising:

an electronic magnetic lock, said electronic magnetic lock disposed on the door of the restroom;

a motion-sensor switch said motion-sensor switch disposed of in wireless electronic communication with a flow of water from a faucet of the sink of the restroom;

wherein said electronic magnetic lock is disposed of in wireless electronic communication with said motion-sensor switch using RF wireless signals;

at least one speaker, said at least one speaker disposed within the restroom;

wherein said at least one speaker is disposed of in wireless electronic communication with said motion-sensor switch using radio frequency signals;

wherein said electronic magnetic lock is configured to lock the door of the restroom automatically upon closure of the door after a user enters the restroom;

wherein said electronic magnetic lock is configured to unlock the door only after said motion-sensor switch is activated and detects the flow of the water from the faucet; and wherein at least one speaker is configured to sound an alert notifying the user to use the sink to wash hands of the user prior to the user exiting the restroom via the door; and an emergency override system coupled to the electronic magnetic lock configured to automatically unlock the electronic magnetic lock on the door of the restroom when a fire-safety system is activated.

15. The system for controlling a door of a restroom automatically of claim 14, wherein the at least one speaker audibly alerts the user of the system for controlling the door of the restroom automatically with a need to use the sink prior to exiting the bathroom to unlock the door.

16. The system for controlling a door of a restroom automatically of claim 14, wherein the emergency override system is further configured to unlock the electronic magnetic lock to automatically provide a quick and safe exit of the restroom in the event of an emergency.

17. The system for controlling a door of a restroom automatically of claim 14, wherein after the door is unlocked, the door will remain unlocked until a predetermined period of time has elapsed.

18. The system for controlling a door of a restroom automatically of claim 14, wherein the at least one speaker is coupled to a logic board.

19. The system for controlling a door of a restroom automatically of claim 18, wherein the logic board is configured to manage the locking/unlocking of the electronic magnetic lock.

20. The system for controlling a door of a restroom automatically of claim 19, wherein the logic board is further configured to activate playback of the audible message over the at least one speaker.

* * * * *